Filed Jan. 29, 1954 2 Sheets-Sheet 1

INVENTOR
W. E. KOCK
BY Harry C. Hart
ATTORNEY

INVENTOR
W. E. KOCK
BY Harry C. Hart
ATTORNEY 2,849,689

DIRECTIONAL FILTER

Winston E. Kock, Basking Ridge, N. J., assignor to Bell Telephone Laboratories, Incorporated, New York, N. Y., a corporation of New York Application January 29, 1954, Serial No. 406,977

6 Claims. (Cl. 333—73)

This invention relates to wave propagation devices and particularly to devices, e. g., filters, which exert a frequency-selective action on the energy applied thereto, passing energy which lies in one part of the frequency range and blocking, by attenuating it or returning it, energy which lies in another part of the frequency range.

A general object of the invention is to endow a frequency-selective element with directional selectivity.

Many situations exist in the signaling arts which require directionally selective action or discrimination simultaneously with frequency-selective action or discrimination. For example, in telephony by the point-to-point transmission of microwaves, repeaters are known which receive energy incoming from one direction, as by an electromagnetic horn, amplify it and launch it in a different direction by another horn. The horns are relied on to maintain separation of the outgoing waves from the incoming waves. As a further precaution against interference, apparatus is provided at the repeater station which effects a change in the microwave carrier frequency, and this apparatus contains frequency-selective components which are directionally reciprocal in their operation.

Accordingly, it is a principal object of the invention to provide an apparatus component for use, for example, in a system which carries telephone messages as modulations on a beam of radiated energy, which is capable of operating simultaneously as a frequency selector and as a direction selector.

A specific object of the invention is to make provision for two-way long distance telephony by way of the point-to-point transmission of radiated energy between each one of a sequence of repeater stations and the next which may utilize a single selected carrier frequency for the entire transmission in one direction and another single selected carrier frequency for the entire transmission in the opposite direction. Thereby the need for frequency-changing apparatus at the several repeater stations is eliminated.

These objects are accomplished, in accordance with the invention, by the provision of a re-entrant waveguide section, which is coupled to rectilinear incoming and outgoing waveguide sections by way of a 4-port hybrid junction and by the provision of means for endowing the closed wave energy path defined by the re-entrant section with phase velocities which differ for the two directions of propagation.

Given such a localized phase velocity difference, the length of a wave advancing around the closed loop in one angular direction, for example clockwise, is elongated as compared with its length in the absence of such phase velocity difference, while the length of a wave advancing in the opposite angular direction around the loop is correspondingly shortened. Evidently the frequency of the wave energy may be so coordinated with the phase velocity difference that the clockwise path embraces an integral number of full wavelengths while the counter-clockwise path embraces an odd number of half wavelengths.

Under this condition wave energy of the appropriate frequency which enters the input port of the rectilinear guide, e. g., at its west terminal, divides at the hybrid junction, one half going directly to the output port, e. g., its east terminal, and the other half entering the closed loop path. The second half travels once around the closed path, e. g., in the clockwise direction, and returns to the rectilinear guide, where it rejoins the incoming energy in phase coincidence. Thus, in effect, the wave energy applied to the west port passes to the east port with no substantial attenuation. Similarly, energy of the same frequency, which may be applied at the east port, divides at the hybrid junction, one half going directly to the west port and the other half entering the closed loop path. Now, however, this second half, after traveling once around the closed loop path in the opposite direction, finds itself in phase opposition to the energy of the main path which it there rejoins, and so cancels it. Consequently, except for a brief initial transient condition, the apparatus blocks such energy, i. e., prevents its travel from the east port to the west port.

The same phenomena occur at each of a plurality of other frequencies which are spaced apart on the frequency scale. The conditions for transmission in one direction and blocking in the other direction differ among themselves only in that each is characterized by a certain integral number of wavelengths around the closed path in one direction and a certain odd number of half wavelengths around it in the opposite direction.

Now between the two adjacent members of every pair of such "forward pass" frequencies, there exists a frequency at which the opposite wavelength relations obtain in the closed loop path. That is, the path embraces an odd number of clockwise half wavelengths and an integral number of counterclockwise full wavelengths. At these frequencies, the transmission action and the blocking action are interchanged. Transmission takes place without substantial attenuation in the east-west direction, and energy of such frequencies which may obtain access to the apparatus at the west terminal is substantially prevented from reaching the east terminal. In other words, the attenuation-frequency characteristic of the apparatus for transmission in the east-west direction is related to that for west-east transmission as its complement. Therefore, as between east-west transmission and west-east transmission, the same apparatus does duty both as a frequency discriminator and as a directional discriminator. Thus the need for changing the carrier frequency at each of a sequence of repeater seations is removed.

It has recently been discovered that when a hyper-frequency electromagnetic waveguide is modified by the placement therein of a strip of ferrite material, offset from the center of the guide cross section and extending lengthwise of the wave propagation path, and when to this ferrite strip a magnetic field is applied, the phase velocity of waves advancing within the guide in one direction differs from the phase velocity of waves advancing within the guide in the opposite direction. This phenomenon is discussed by J. H. Rowen in "Ferrites in Microwave Applications," published in the Bell System Technical Journal for November 1953, vol. 32, page 1333.

Such a ferrite-loaded wave guide structure is thus an appropriate component for the present invention. It is, in principle, operative at frequencies much lower than so-called microwave frequencies. However, as a practical matter, it is restricted to microwave frequencies because at lower frequencies its dimensions are required to be excessive. When it is desired to employ the principles of the invention at lower frequencies, a nonreciprocal acoustic wave guide structure may be employed. Thus an acoustical wave-guiding pipe may be returned upon itself to form a closed path so that it may support acoustic compression waves, and a steady air current or wind may be caused to proceed around the closed path. The phase velocity of compression waves, which advance in both directions, is now increased in one angular direction and diminished in the opposite angular direction by the addition or subtraction of the velocity of the wind which blows with the waves in one direction and against them in the other direction. The wind may be caused to blow around the closed path by any desired means, e. g., by the movement of one wall of the wave-guiding structure with respect to the others and by the provision of air-circulating vanes thereon. When the wind speed is coordinated with the frequency of such wave energy in the fashion discussed below, the acoustic device behaves, from the standpoint of addition and subtraction of wave energy, in the manner discussed above. The lengths of sound waves in air are such that compact devices of entirely practicable dimensions may be constructed to operate in this fashion in the frequency range of 5000 to 50000 cycles per second.

The invention will be fully apprehended from the following detailed description of preferred illustrative embodiments thereof taken in connection with the appended drawings, in which.

Figure 1:
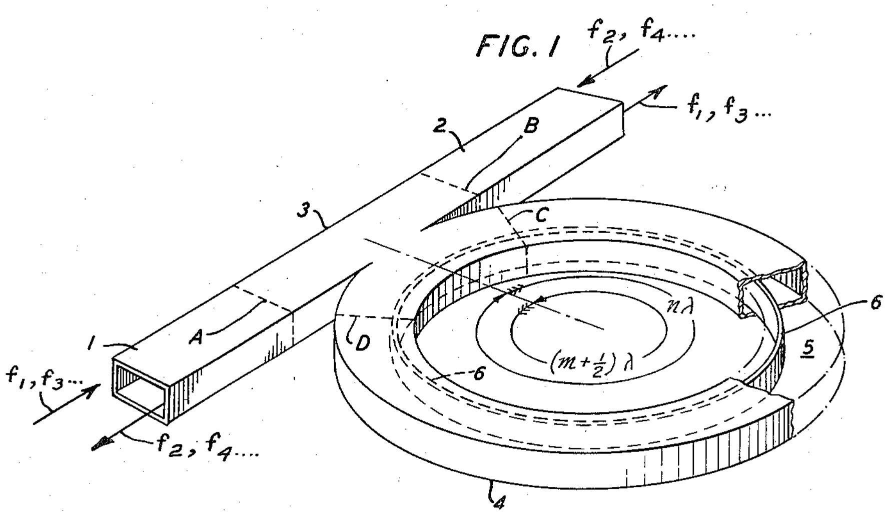
Fig. 1 is a perspective view, partly in section, of a hyperfrequency electromagnetic wave guide structure embodying the nonreciprocal phase velocity feature of the invention and having both frequency-selection and direction-selection properties.

Referring now to the drawings, Fig. 1 shows rectilinear sections 1 and 2 of hyperfrequency electromagnetic wave guide intercoupled by way of the ports A and B of one branch of a directional coupler 3. The two ports C and D of the second branch of the directional coupler 3 are intercoupled by way of a curved section 4 of hyperfrequency electromagnetic wave guide in such a way that this section of the coupler forms therewith a completely closed loop path 5 for wave energy therein.

The directional coupler 3 is shown as coupling its two branches by way of their shorter sides. Such couplers are well known in the art. One suitable form is shown and described by S. E. Miller and W. W. Mumford in the Proceedings of the Institute of Radio Engineers for September 1952, vol. 40, page 1071. Other directional couplers and the principles and design features by virtue of which they operate are described by G. C. Southworth in "Principles and Applications of Wave Guide Transmission," Van Nostrand, 1950.

With this construction, electromagnetic wave energy traveling in the east-west direction, for example, and of a frequency appropriate for transmission through the rectilinear guide sections 1, 2, 3, may be applied to the section 1. It travels to the junction point of the coupler 3, whereupon it divides into two substantially equal parts, of which the first travels to the output port B and so to the section 2, while the second is transferred to the other branch of the coupler 3 and enters the re-entrant guide at the port C. Here it travels in the clockwise direction and returns to the coupler 3 by way of the port D. When the length of the closed loop path 5 is coordinated with the wavelength of the wave energy within it in such a fashion that it embraces an integral number of full wavelengths, then this energy, returning after one complete circuit of the closed path, rejoins the energy in the rectilinear path in phase coincidence therewith and so travels by way of the port B to the guide section 2. Thus the directional coupler 3 and the guide section 4 have introduced no attenuation between the port A and the port B.

On the other hand, if the frequency of the incoming energy be so coordinated with the length of the closed loop path 5 that the latter embraces an odd number of half wavelengths, then the energy entering the re-entrant guide portion 4 at the port C, after making one complete circuit of the loop 5, rejoins the energy in the main path 3 in phase opposition thereto and so tends to cancel it. At that frequency, therefore, the effect of the closed loop path 5 is to block the passage of wave energy from the port A to the port B.

In accordance with the invention, one of these effects takes place for transmission in the one direction, e. g., from section 1 to section 2, or west to east, while the other takes place simultaneously for transmission in the opposite direction, e. g., from section 2 to section 1, or east to west. This novel result is secured by providing a phase velocity within the closed loop path 5 having one value for transmission in the clockwise direction and another value for transmission in the counterclockwise direction. This nonreciprocal phase velocity feature may be attained by the inclusion, within the closed loop 5, of a strip 6 of ferrite material which extends lengthwise throughout the closed loop, and sidewise from one of the two longer sides to the other, being offset from the center of the cross section; i. e., closer to one short side than to the other, and by the application of a magnetic field thereto.

Figure 2:
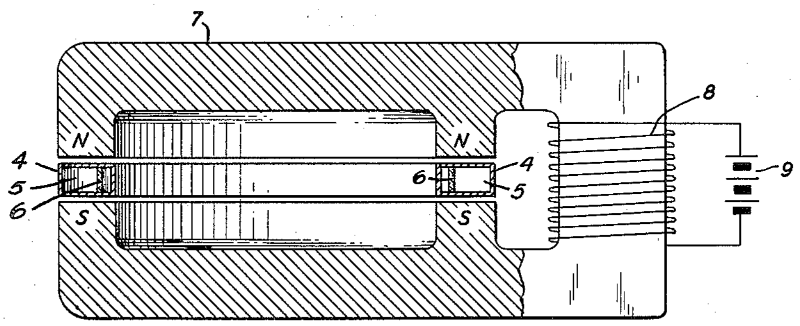
Fig. 2 is a schematic diagram showing apparatus for applying a steady magnetic field to the apparatus of Fig. 1, thus endowing it with the nonreciprocal phase velocity feature of the invention.

In operation, a steady magnetic field is applied to this ferrite material in the direction perpendicular to its length and perpendicular to its shortest dimension, i. e., in a direction parallel with the axis of the closed loop. Fig. 2 shows one simple means for applying the magnetic field in the required fashion, namely by the provision of an electromagnet 7 having two oppositely disposed pole pieces, each of which is shaped, as by machining, to a form the same as that of the re-entrant wave guide structure 4. When the wave guide structure is placed between the poles and when the magnet 7 is energized as by a coil 8 and a current source 9, the magnetic flux has the required configuration. The ferrite material itself of which the strip is made may be of any suitable variety. Materials having the necessary properties are discussed in the J. H. Rowen article above referred to and in footnotes thereto.

With any particular combination of the material and dimensions of the ferrite strip 6 and of the magnetic field applied to it, the re-entrant wave-guiding structure of Fig. 1 is characterized by two different phase velocities for waves progressing around the closed path within it. One of these phase velocities exceeds the normal phase velocity $v_0$, which would obtain within the guide without the ferrite and the field, by the phase velocity differential $\Delta v$. The other is reduced as compared with $v_0$ by the same amount. The effect of such phase velocity differential is to elongate the length $\lambda$ of a wave progressing around the closed path in one direction, here illustrated as the clockwise direction, and to shorten the length of a wave of the same frequency progressing around the path in the opposite direction. Given a desired frequency of operation, the phase velocity differential may be adjusted, as by controlling the strength of the magnetic field, to a magnitude such that the number of wavelengths in one angular direction embraced within the closed loop path differs from the number of wavelengths in the opposite angular direction embraced within the closed loop path by an odd number of half wavelengths. In the present example, the closed path embraces $n$ full wavelengths in the clockwise direction and $m+\frac{1}{2}$ wavelengths in the counterclockwise direction, where $m$ and $n$ are integers.

Under these conditions transmission of energy of the operating frequency $f_1$ from west to east takes place in the fashion described above, i. e., with no substantial attenuation interposed between the ports A and B by the directional coupler 3 and the closed path 5 coupled thereto. However, if energy of the same frequency should find access to the port B, it would be blocked by the action of the closed path 5 in the fashion described above.

Figure 3:
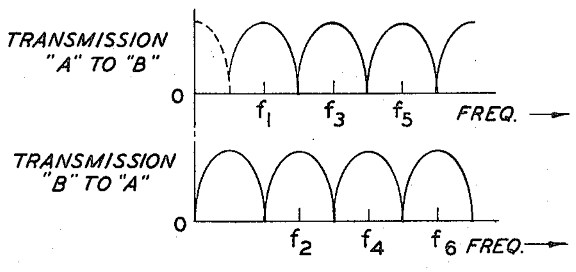
Fig. 3 shows attenuation-frequency characteristics of the apparatus of Fig. 1 for transmission in the west-east direction and in the east-west direction, respectively.

Evidently the full, unattenuated transmission takes place in the west-east direction at any of the various frequencies for which the closed path defined by the re-entrant guide portion embraces an integral number of wavelengths for wave energy traveling around it in the clockwise direction. These frequencies are indicated in Fig. 3 as $f_1$, $f_3$, $f_5$ etc. The east-west transmission characteristic of Fig. 3 shows nulls at these frequencies. Evidently, too, between every two members of this sequence there lies a frequency at which the closed path 5 defined by the re-entrant guide portion 4 embraces an odd number of half wavelengths for energy traveling in the clockwise direction. At such frequencies, designated in Fig. 3 $f_2$, $f_4$, $f_6$, etc., the apparatus introduces a blocking impedance for transmission in the west-east direction. By the same token, however, at or very close to each such frequency there exists a frequency for which the closed path defined by the re-entrant guide portion embraces an integral number of full wavelengths for energy advancing around it in the counterclockwise direction, and at these frequencies the apparatus transmits without substantial attenuation in the east-west direction. Thus, it serves at the same time to discriminate, for any direction of transmission, between desired and undesired directions of transmission.

Figure 4:
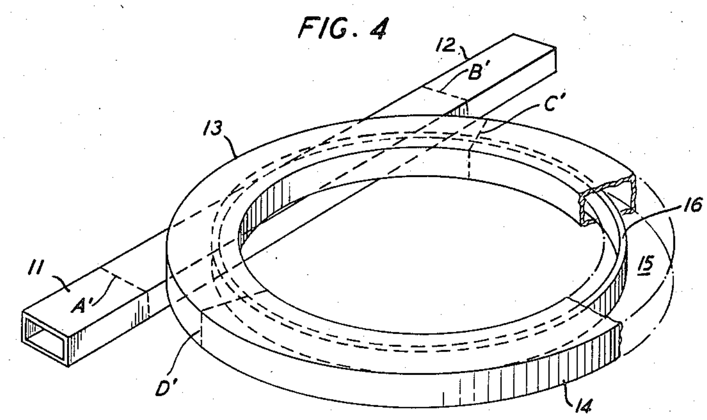
Fig. 4 is a perspective view, partly in section, of a modification of the apparatus of Fig. 1.

Fig. 4 shows an alternative which differs from Fig. 1 only in that the coupling between the straight guide portions 11, 12 and the reentrant guide portion 14 is effected by way of a directional coupler 13 in which the communicating apertures between the walls of the two guide portions are pierced in the longer sides of the guides. Such a directional coupler is shown, for example, in Riblett Patent 2,568,909.

Figure 5:
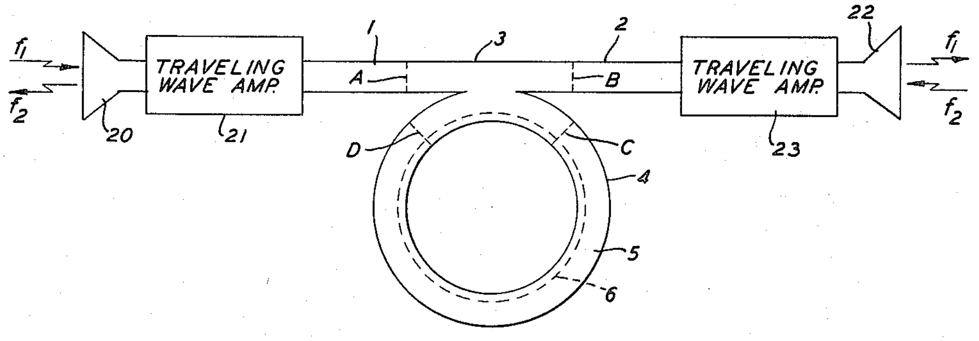
Fig. 5 is a schematic diagram showing the essentials of a microwave repeater station embodying the invention.

Fig. 5 shows the essential elements of a microwave repeater station embodying the invention. Here incoming microwave energy transmitted by radio, arriving from the west and of a frequency $f_1$, for example, of 10000 mc., is picked up by suitable means such as an electromagnetic horn 20. It is amplified, for example by a traveling wave amplifier 21, and is then applied to the apparatus of the invention. The latter, acting as a frequency filter, eliminates frequencies near the desired one and passes the energy of the desired frequency without substantial attenuation to a radiating device, for example a second electromagnetic horn 22. It reaches the horn 22 by way of a traveling wave amplifier 23 through which it passes in the backward direction and is therefore neither amplified nor attenuated thereby. Kompfner Patent 2,653,270 discloses an amplifier which contributes gain in the forward direction but introduces no substantial loss in the backward direction.

At the same time, energy arriving from the east with a frequency $f_2$, for example 10200 mc., enters the horn 22, passes in the forward direction through the traveling wave amplifier 22 which contributes gain to it, passes the apparatus of the invention as a frequency filter which eliminates neighboring frequency components of no interest, passes the traveling wave amplifier 21 in the backward direction, and is radiated toward the west by the first horn 20.

If, by chance, the energy of the frequency $f_1$ which normally travels from west to east should find access to the east end horn 22, or if energy of the frequency $f_2$ should find access to the west end horn 20, it would in each each case be blocked by the apparatus of the invention, acting now in its directional discriminating character in the manner explained above. This double-discrimination feature makes it possible to dispense completely with the frequency-changing apparatus which is a usual component of a microwave repeater station, and with all its attendant complications.

Figure 6:
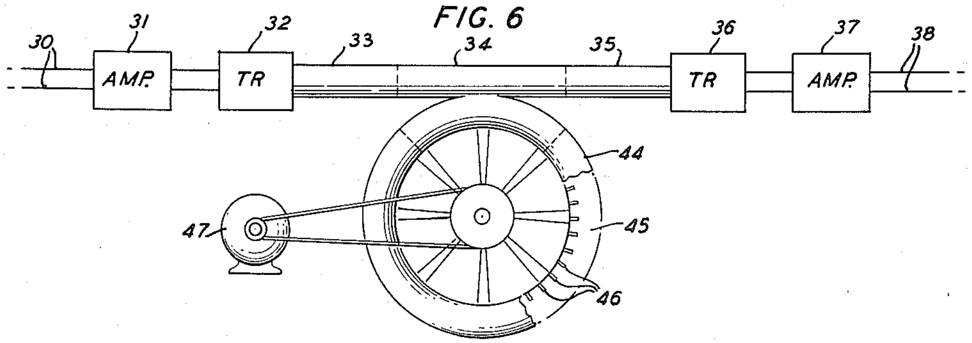
Fig. 6 is a schematic diagram showing an acoustic counterpart of the apparatus of Fig. 5.

The invention is applicable in principle in any part of the frequency range. However, hyperfrequency electromagnetic wave guide structures are awkwardly large when constructed for transmission of electromagnetic waves in the kilocycle range. For two-way communication at these frequencies, therefore, it may be desirable to transform the energy to another kind whose wavelengths are of a more suitable order. Acoustic compression waves lend themselves to this purpose. Fig. 6 shows such a lower frequency counterpart of the apparatus of Fig. 5. Here energy incoming over a line 30, and of a frequency which may be of the order of 10 to 50 kilocycles per second, is first raised to a suitable power level by an amplifier 31, and then converted by a transducer 32 into compression wave energy which advances from west to east within a first branch 33 of an acoustic wave guide. At some point along the length of this guide it is coupled by way of a directional coupler 34 to a second branch 44 which is returned upon itself to form a closed path 45 for compression wave energy therein. A current of air is caused to flow in one direction around this closed path. To this end a paddle wheel or turbine may be mounted centrally of the path whose periphery bears vanes 46 which extend through a slot in the wall of the pipe 44 into its interior to move the air therein at a speed which may be adjusted to the required value by control of a driving motor 47. The considerations of addition and subtraction as between wave energy in the direct path 33, 34, 35 and wave energy returning thereto after one complete circuit of the closed path 45 are identical with those which hold with respect to Fig. 1, provided only that the air stream speed be appropriately coordinated with the frequency of the wave energy. With this proviso, wave energy arriving from the west and having a prescribed frequency passes to the east without substantial attenuation. It may be reconverted to electrical energy by a transducer 36 for transmission over an outgoing line 38, and again raised in power level by an amplifier 37. From the considerations described in detail above with respect to Fig. 1, it will be understood that wave energy of the same frequency which may have found access to the system at the east terminal is blocked by the apparatus of the invention whereas wave energy of a different preassigned frequency may be passed freely from east to west but will be blocked should it find access to the system at the West end terminal.

At telephone carrier frequencies, the well known 22-type repeater furnishes the two-way amplification required by the elements 31, 37.

Instead of carrying the air circularly around the guide as in Fig. 6, the air which carries the compression waves may be bodily transported as by containing it in a toroidal screen which is borne on the circumference of a disk or spider which in turn is centrally mounted for rotation within the wave guide structure. Experiment has shown that conventional window screen material serves well for the bodily transport of a volume of air within it while permitting easy ingress thereto and egress therefrom of compression wave energy such as that applied to it by way of a directional coupler.

A directional coupler 33 for acoustic compression waves may be constructed of two sections of pipe whose cross sections are circular in form and alike in area. They are brought into adjacent parallel juxtaposition as by welding and a plurality of holes are drilled in a row through the two adjacent walls. Preferably these holes are equally spaced apart, the spacing between adjacent holes being less than one-quarter wavelength. Preferably, too, and in the interest of making for broadband operation, the holes are tapered downward in magnitude from the middle hole of the row, which is the largest, to the holes at the two ends of the row which are the smallest.

The invention, which has been illustrated in connection with two different kinds of wave phenomena, is in principle applicable to any situation wherein waves of any sort travel in one direction around a closed loop path under one condition and travel in the opposite direction around the same path under a different condition. In accordance with the invention the phase velocities, and therefore the wavelengths, may be given different magnitudes for these two directions of wave advance, with consequent differences in the transmission of the apparatus as a whole. In particular, the phase velocity difference may be so coordinated with the frequency of the wave energy that the closed path embraces an integral number of wavelengths in one direction and an odd number of half wavelengths in the other direction, with the consequence that the transmission vs. frequency characteristics of the device for transmission in the two directions bear a complementary relation to each other.

What is claimed is:

1. The combination which comprises a linearly extended wave-guiding structure having a first port and a second port and defining an open wave translating path for wave energy therein, a re-entrant wave-guiding structure defining a closed loop wave translating path for wave energy therein, a directional coupler interconnecting said extended structure with said re-entrant structure, said reentrant structure including within it, means for establishing a phase velocity of one magnitude for waves advancing in one direction around said loop path and a phase velocity of a different magnitude for waves advancing in the opposite direction around sad loop path, means for introducing wave energy of a preassigned frequency at said first port, and means for utilizing wave energy emergent at said second port, said frequency being so coordinated with said different phase velocities and with the length of said closed loop path that said closed loop path embraces an integral number of full wavelengths in one angular direction and an odd number of half wavelengths in the opposite angular direction, whereby energy of said frequency is passed from said first port to said second port while energy of said frequency which may enter said second port is blocked from reaching said first port.

2. Apparatus as defined in claim 1 wherein the reentrant wave-guiding structure is a hyperfrequency electromagnetic wave guide.

3. Apparatus as defined in claim 2 wherein the means for establishing said unequal phase velocities comprises a strip of ferrite material located within said re-entrant wave-guiding structure and extending lengthwise of said closed loop path, and means for subjecting said strip to a magnetic flux.

4. Apparatus as defined in claim 2 wherein said wave-guiding structure is of rectangular cross section having two longer sides and two shorter sides.

5. Apparatus as defined in claim 4 wherein the means for establishing the unequal phase velocities comprises a polarized strip of ferrite material extending lengthwise throughout the length of said closed loop path and sidewise from one of said longer sides of said wave-guiding structure to the other of said longer sides, and located at unequal distances from said shorter sides.

6. The combination which comprises a wave-guide component having a first pair of conjugately related branches and a second pair of conjugately related branches, each branch of each pair being coupled within said component to both branches of the other pair, an external reentrant wave-guiding structure coupling one branch of the first pair to one branch of the second pair, and constituting, with said component, a closed loop transmission path for wave energy therein, said reentrant structure including within it means for establishing a phase velocity of one magnitude for waves advancing in one direction around said loop path and a phase velocity of a different magnitude for waves advancing in the opposite direction around said loop path, means for introducing wave energy of a preassigned frequency at the second branch of the first pair, and means for utilizing wave energy emergent at the second branch of said second pair, said frequency being so coordinated with said different phase velocities and with the length of said closed loop path that said closed loop path embraces an integral number of full wavelengths in one angular direction and an odd number of half wavelengths in the opposite angular direction, whereby energy of said frequency is passed from the second branch of said first pair to the second branch of said second pair, while energy of said frequency which may gain direct access to the second branch of said second pair is blocked from reaching the second branch of said first pair.

References Cited in the file of this patent

UNITED STATES PATENTS

| | | |
|---|---|---|
| 2,595,186 | Breetz | Apr. 29, 1952 |
| 2,639,326 | Ring | May 19, 1953 |
| 2,644,930 | Luhrs | July 7, 1953 |
| 2,683,855 | Blitz | July 13, 1954 |
| 2,700,138 | Craick | Jan. 18, 1955 |
| 2,728,050 | Van de Lindt | Dec. 20, 1955 |

OTHER REFERENCES

Publication I, Hogan, "The Ferromagnetic Faraday Effect at Microwave Frequencies and its Applications," Bell System Tech. Journal, vol. 31, pp. 1–31, January 1952.

Publication II, Riblet, "The Short Slot Hybrid Junction," Proc. of the I. R. E. vol. 40, No. 2, February 1952, pp. 180–184.

Publication III, Kales et al., "A Non-Reciprocal Microwave Component," Journal of Applied Physics, vol. 24, No. 6, pp. 816 and 817.